INVENTOR.
JAMES McEWAN
BY
Allen and Chromy
ATTORNEYS

United States Patent Office 3,418,757
Patented Dec. 31, 1968

3,418,757
LAWN MOWER SHARPENER
James McEwan, 138 Stockton Ave.,
San Jose, Calif. 95111
Filed July 11, 1966, Ser. No. 564,214
3 Claims. (Cl. 51—34)

ABSTRACT OF THE DISCLOSURE

A device for sharpening lawn mowers, including a frame supporting the lawn mower part to be sharpened, said part being mounted between a pair of opposed shafts. One of the shafts is pivoted for both horizontal and vertical adjustment so that the position of the lawn mower part with respect to the grinding wheel may be adjusted after the part is mounted between said shafts.

---

This invention relates to lawn mower sharpeners in general. More particularly, this invention relates to a lawn mower shapener provided with precision means for adjusting the position of the part being sharpened.

An object of this invention is to provide an improved lawn mower sharpener with precision positioning means.

Another object of this invention is to provide an improved lawn mower sharpener which can be used to sharpen both the reel blades and the bed knife, as well as rotary mower blades, these parts being adapted to be supported in front of the grinding wheel between suitable adjustable standards, one of which is provided with means for making fine adjustments so that the lawn mower parts to be sharpened may be properly aligned with respect to the grinding wheel after being supported by said standards.

Still another object of this invention is to provide an improved lawn mower sharpener in which the lawn mower parts to be sharpened are adapted to be supported in front of the grinding wheel between suitable standards upon which the operator places the parts to be sharpened, one of the standards being provided with means for making fine adjustments whereby, after the operator positions the lawn mower part to be sharpened on said standards the final positioning of said part with reference to the grinding wheel may be made accurately by said precision positioning means.

Other and further objects of this invention will be apparent to those skilled in the art to which it relates from the following specification, claims and drawing in which, briefly:

FIG. 6 is a fragmentary view showing one end of a rotary mower blade supported in this apparatus for sharpening.

Figure 1:
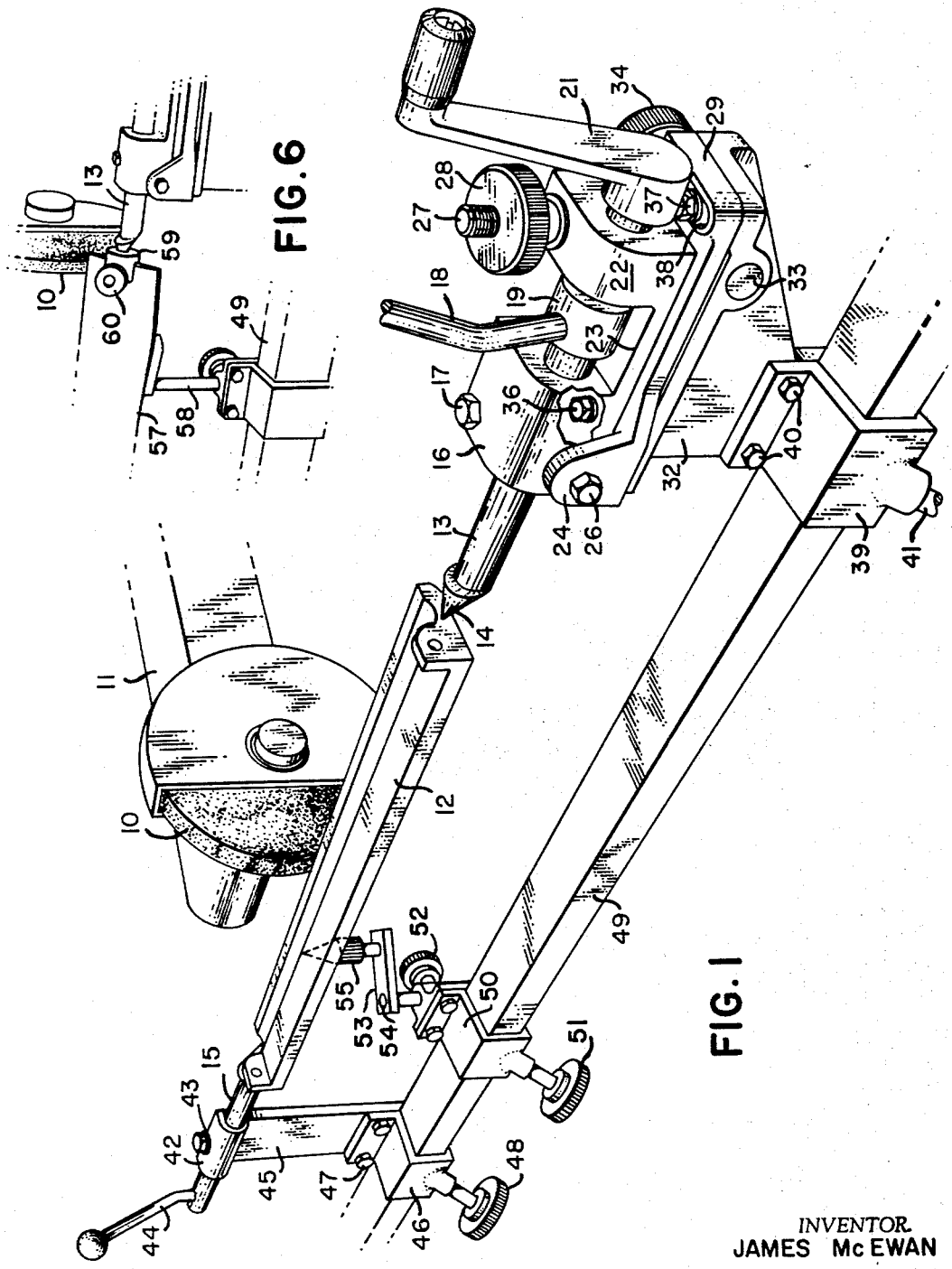
FIG. 1 is a partial perspective view of this lawn mower sharpener arranged to sharpen the bed knife of the lawn mower.

This invention is an improvement over the lawn mower sharpener described and claimed in my prior Patent No. 3,045,398 issued July 24, 1962, and reference is made to this prior patent for certain details of the lawn mower sharpener which are not shown and described herein.

Referring to the drawing in detail, reference numeral 10 designates a grinding wheel which is supported on the grinding head frame 11 constructed as shown and described in the above mentioned patent. The lawn mower bed knife 12 is supported horizontally between the shafts 13 and 15, each of which is provided with a pointed offset end such as the end 14 of shaft 13. These pointed ends are offset with respect to the axes of the respective shafts.

Figure 4:
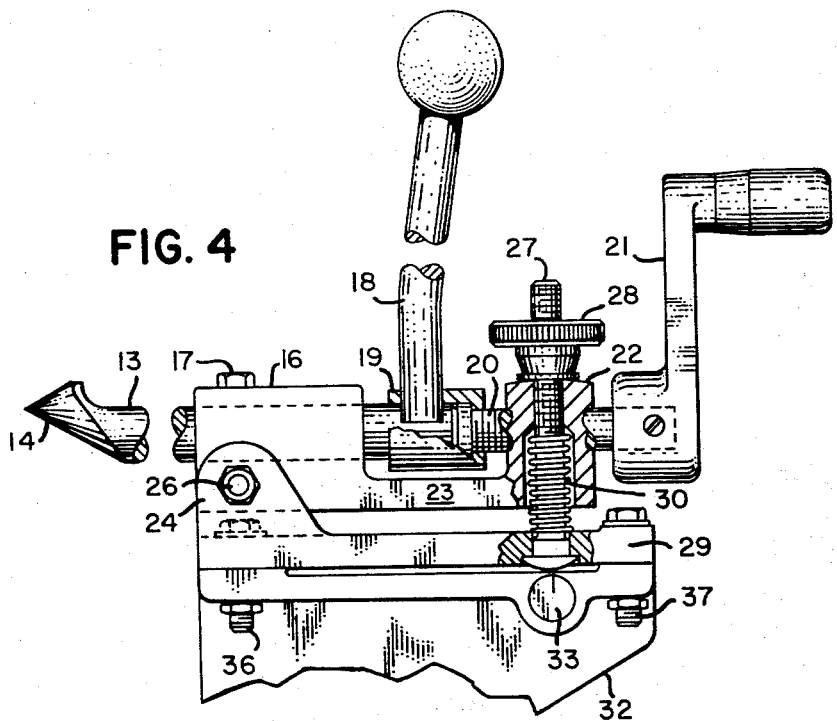
FIG. 4 is a detail side view partially in section of the precision adjusting means employed for supporting the lawn mower parts to be sharpened in accordance with this invention.

The shaft 13 is lightly clamped in the split boss 16 by means of a bolt which permits the shaft 13 to be moved slidably and rotatably but applies enough friction to hold shaft 13 in any set position. A handle 18 is attached to the outer end of the shaft 13 and this handle extends through a hole in the collar 19, as shown in FIG. 4. Thus, the handle 18 retains the collar 19 on the shaft 13. The collar 19 is provided with an inwardly extending flange for engaging an outwardly extending flange on the threaded rod 20 for holding this rod assembled with the shaft 13. A handle 21 is provided to the outer end of the rod 20 which extends through the threaded boss 22 supported on the outer end of the plate 23. Thus, the shaft 13 may be either advanced toward or retarded from the lawn mower part 12 by turning the handle 21.

Bosses 16 and 22 are formed integral with the member 23 and this assembly is pivotally supported on the uprights 24 and 25 of the member 29 by the bolt 26. An adjusting bolt 27 extends vertically through the boss 22 and the head of this bolt is positioned in the supporting member 29, as shown in FIG. 4. A knurled nut 28 is provided to the bolt 27 and a coil spring 30, part of which is positioned in a cavity formed in the lower part of the boss 22, surrounds a portion of the bolt 27. The upper end of the spring 30 engages the boss 22 in the upper end of the aforesaid cavity and the lower end of this spring engages surfaces of the member 29 around the hole in which the bolt 27 is positioned. Spring 30 is under compression so that, as the knurled nut 28 is either tightened or loosened, the pointed end 14 of the shaft 13 is either raised or lowered around the axis of the pivoting bolt 26.

Figure 5:
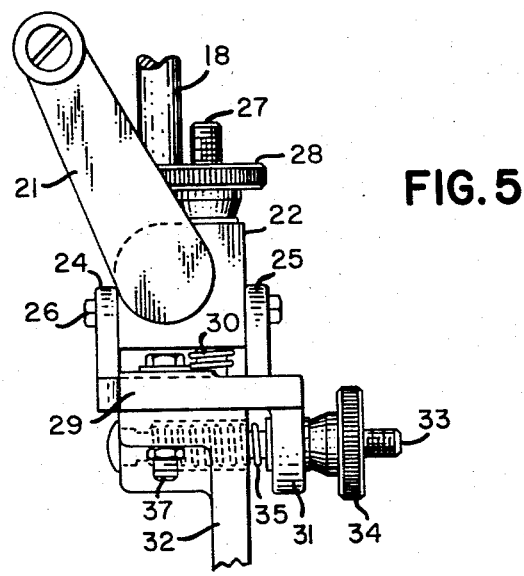
FIG. 5 is an end view of the precision adjusting means shown in FIG. 4.

The member 29 is attached to the upper end of the standard 32 by bolts 36 and 37. The member 29 is provided with a slot 38 in which the bolt 37 is positioned. Thus, by loosening the bolt 37 slightly, member 29 may be rotated around the bolt 36 as a pivot to the extent permitted by the length of the slot 38. This adjustment may be provided by manipulating the knurled nut 34 of the bolt 33 which is positioned in a hole formed in the upright member or standard 32 and extends through a hole formed in the depending member 31 attached to the bottom of member 29, as shown in FIG. 5. A coil spring 35 is positioned in a cavity formed in the standard 32 around the bolt 33 so that the one end of this spring 35 engages the inner end of the cavity adjacent to the head of the bolt 33, and the other end of this spring extends out of this cavity and engages the inner side of the depending member 31. This spring is under compression so that, as the knurled nut 34 is either tightened or loosened on the bolt 33, the pointed end 14 of the shaft 13 is moved sidewise around the pivoting bolt 36.

The upright member or standard 32 is attached to the collar 39 by the bolts 40, as shown in FIG. 1, and this collar is slidably supported on the rail or frame member 49. A clamping bolt 41 is threaded into the member 39 so that this member may be fixedly attached to the frame 49 in a selected predetermined position.

Figure 2:
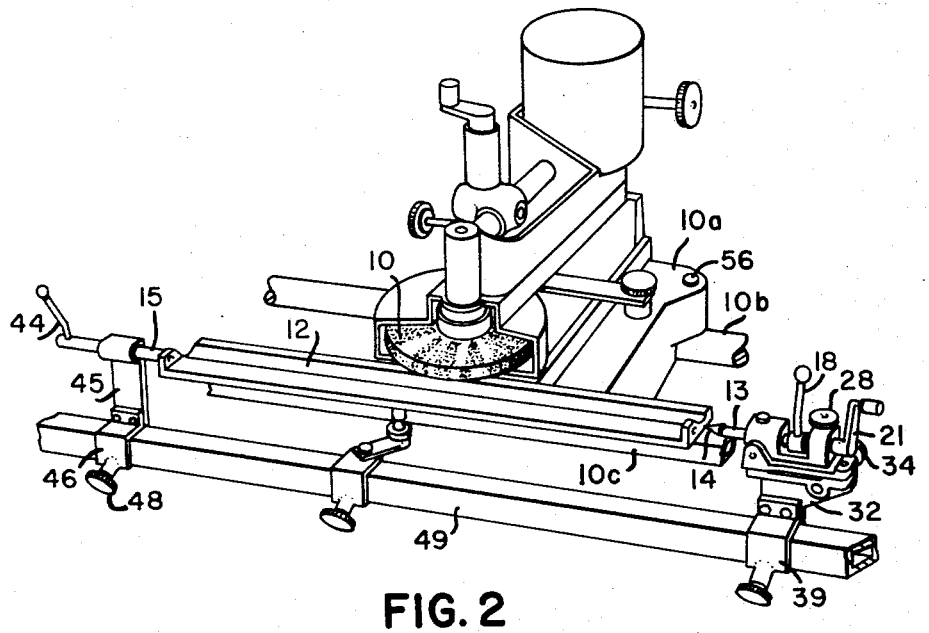
FIG. 2 is another partial perspective view showing this invention supporting a lawn mower bed knife being ground by a horizontally positioned grinding wheel.

The other shaft 15 which supports the other end of the lawn mower bed knife 12, as shown in FIGS. 1 and 2, is slidably positioned in the boss 42. This boss is also split and a clamping bolt 43 is provided to hold the desired position by friction around the shaft 15. A handle 44 is provided to the shaft 15 for rotating this shaft in the boss 42. Boss 42 is attached to the upper end of the standard 45 which is attached by bolts 47 to the collar 46. A suitable clamping bolt 48 with a hand grip is provided to the collar 46 for clamping this collar to the frame member 49.

The grinding wheel 10 may be positioned in the vertical position shown in FIG. 1 for grinding the forward edge of the lawn mower bed knife 12, or it may be positioned in the horizontal position shown in FIG. 2 for grinding the upper edge of the lawn mower bed knife 12. The details of construction permitting, these grinding wheel adjustments are clearly shown and described in my prior Patent No. 3,045,398, referred to above.

The lawn mower bed knife 12 is, of course, removed from the mower for the sharpening operation and it is supported in the sharpener, as shown in FIGS. 1 and 2. If, after the bed knife 12 is positioned between the shafts 13 and 15, it is found that the forward edge thereof is not parallel to the axis of the grinding wheel 10 (FIG. 1), or to a face plane thereof (FIG. 2), then the operator may move the grinding wheel and the supporting mechanism thereof along the frame of the sharpener and, at the same time, he can adjust the knurled nuts 28 and 34 to move the pointed end 14 of the supporting shaft either up or down or sidewise, as required to adjust the bed knife 12 so that it is parallel to the axis or plane of the grinding wheel 10. The bed knife 12 may, of course, be adjusted to a greater extent by moving the handle 18 and the handle 44 so that the pointed ends of the shafts 13 and 15 are rotated. This provides the primary adjustment of the bed knife to the grinding wheel while the precision adjustments are made by adjusting the knurled nuts 28 and 34.

Another collar 50 is provided to the frame member 49 for supporting the steadying member 55 under the mower bed knife 12. Collar 50 is provided with a screw 51 for tightening the collar on the member 49 at a selected position. Steadying member 55 is attached to the plate 53 which is provided with a rod 51 that is adapted to be clamped by hand bolt 52 in a socket provided to the rear of collar 50. Thus, the plate 53 and member 55 may be rotated with respect to the collar 50 before tightening the bolt 52 so that the member 55 may be positioned under the desired part of the knife 12 to keep this knife from rotating on its supports during the sharpening thereof.

Also, each corner of the carriage 10a of the grinder is provided with felt wipers, such as wiper 56 shown in FIG. 2, positioned in a hole formed in the carriage. These felt wipers engage top surfaces of the frame members 10b and 10c when the carriage is shifted on these members and wiper grindings, dirt, etc. therefrom.

Figure 3:
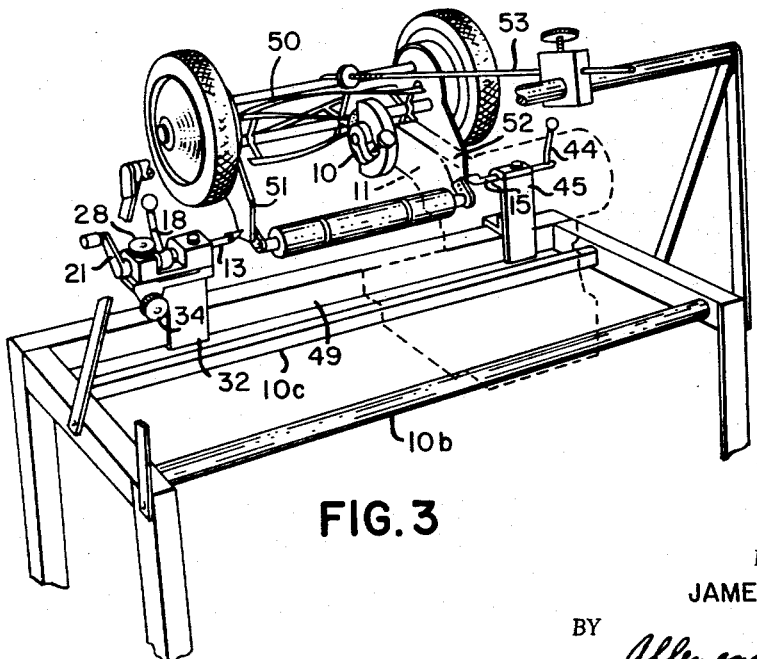
FIG. 3 is a perspective view showing this invention employed in the sharpening of the reel blades of the lawn mower.

FIG. 3 is a view showing this sharpener with a lawn mower 50 supported thereon and with the reel thereof positioned preparatory to sharpening the reel blades thereof. The end plates 51 and 52 of the lawn mower are engaged by the pointed members of shafts 13 and 15, respectively, and the rod 53 of the lawn mower sharpener mechanism is attached to a frame member of the lawn mower to keep the mower from tilting as it is held in the sharpener. After the reel is supported between the shafts 13 and 15, fine adjustments thereof with respect to the grinding wheel 10 may also be made by manipulating the knurled nuts 28 and 34. Thus, the final positioning of the reel may be made by adjusting the nuts 28 and 34 while the reel is supported by the shafts 13 and 15.

In FIG. 6 there is illustrated a fragmentary view of this apparatus with a rotary mower blade supported therein for sharpening. Only one end of the blade 57 is shown. Both blade ends are provided with grips such as the slotted grip 59. The end of the blade 57 is inserted into the slot of grip 59 and clamped therein by the clamping screw 60. Grip 59 is also provided with a circular recess for receiving the pointed end of shaft 13. The grip at the other end of blade 57 cooperates with shaft 15 and the blade 57 is supported by the grips between these shafts in a similar manner as the knife 12 shown in FIG. 1.

While I have shown a preferred embodiment of the invention, it will be understood that the invention is capable of variation and modification from the form shown so that its scope should be limited only by the proper scope of the claims appended hereto.

What I claim is:

1. In a lawn mower sharpener, the combination of a frame, means mounting a mower part to be sharpened on said frame, a grinder having a grinding wheel, said grinder being mounted for sliding movement on said frame so that said grinding wheel may be traversed over surfaces of said mower part to be sharpened, said mounting means having a pair of opposed shafts clamping said mower part therebetween, pivoting means supporting at least one of said shafts, the end of said mower part supported by said last mentioned shaft being adapted to be moved by said pivoting means with respect to said grinding wheel after said part is supported by said opposed shafts so that desired alignment of said mower part with respect to said grinding wheel is obtained, said pivoting means comprising a boss slidably receiving said one shaft, a plate pivotally attached to said boss by a substantially horizontal pivot, a threaded member tilting said one shaft and said boss vertically with respect to said plate about said substantially horizontal pivot as an axis, a second pivot in a substantially vertical position attaching said plate to said frame and a second threaded member supported by said frame and engaging said plate for shifting said one shaft in the horizontal direction about the axis of said second pivot.

2. In a lawn mower sharpener, the combination as set forth in claim 1 further characterized in that said plate is provided with a pair of upstanding members and said boss is positioned therebetween, said upstanding members supporting said horizontal pivot.

3. In a lawn mower sharpener, the combination as set forth in claim 1 further characterized in that said plate is provided with a depending member positioned at one side of said frame, said depending member having a hole receiving said second threaded member.

References Cited

UNITED STATES PATENTS

| 2,434,753 | 1/1948 | Andreasson | 51—232 |
| 3,045,398 | 7/1962 | McEwan | 51—48 |
| 2,547,845 | 4/1951 | Andreasson | 51—232 |
| 2,286,970 | 6/1942 | Maynard | 51—48 |

FOREIGN PATENTS 1,118,646  11/1961  Germany.

JAMES L. JONES, JR., *Primary Examiner.*

U.S. Cl. X.R.

82—31; 90—23